(12) United States Patent
Murakoshi et al.

(10) Patent No.: US 9,166,387 B2
(45) Date of Patent: Oct. 20, 2015

(54) WIRE HARNESS ATTACHMENT STRUCTURE

(75) Inventors: Hiroyuki Murakoshi, Toyota (JP); Takahiro Abe, Toyota (JP)

(73) Assignee: Yazaki Corporation, Tokyo (JP)

( * ) Notice: Subject to any disclaimer, the term of this patent is extended or adjusted under 35 U.S.C. 154(b) by 103 days.

(21) Appl. No.: 13/819,929

(22) PCT Filed: Jul. 28, 2011

(86) PCT No.: PCT/JP2011/067248
§ 371 (c)(1),
(2), (4) Date: Apr. 25, 2013

(87) PCT Pub. No.: WO2012/029467
PCT Pub. Date: Mar. 8, 2012

(65) Prior Publication Data
US 2013/0206928 A1   Aug. 15, 2013

(30) Foreign Application Priority Data

Sep. 2, 2010 (JP) ................................. 2010-196508

(51) Int. Cl.
*H02G 3/04* (2006.01)
*F16L 3/10* (2006.01)
(Continued)

(52) U.S. Cl.
CPC .......... *H02G 3/0406* (2013.01); *B60R 16/0215* (2013.01); *F16L 3/1025* (2013.01); *H02G 3/0418* (2013.01); *H02G 3/32* (2013.01)

(58) Field of Classification Search
CPC ..... F16L 3/1025; F16L 3/1075; F16L 55/035; F16L 55/02; H02G 3/04; H02G 3/30; H02G 3/32; H02G 3/34; H02G 3/36; H02G 3/263; B60R 16/0215
USPC .............. 248/58, 62, 63, 68.1, 74.1, 74.2, 73; 174/72 A, 68.1, 95–99; 24/16 PB, 455, 24/54; 296/199, 208
See application file for complete search history.

(56) References Cited

U.S. PATENT DOCUMENTS 3,757,269 A * 9/1973 Baumgartner et al. ......... 439/99
5,065,562 A * 11/1991 Larsen et al. ................... 52/772
(Continued)

FOREIGN PATENT DOCUMENTS

JP   2002-176716 A   6/2002
JP   2005-137133 A   5/2005
(Continued)

OTHER PUBLICATIONS

Extended European Search Report dated Jan. 19, 2015, issued by the European Patent Office in counterpart European application No. 11821485.7.
(Continued)

*Primary Examiner* — Tan Le
(74) *Attorney, Agent, or Firm* — Sughrue Mion, PLLC (57) ABSTRACT

An object is to mount a harness protector on a circular-sectional-shaped reinforcing member stably in a space-saving manner. A protector into which a wiring harness is inserted is arranged on a top portion of a circular-sectional-shaped horizontal reinforcing member at a vehicle side along a longitudinal direction of the reinforcing member. A curved bottom surface formed on a bottom of the protector is engaged with a curved top surface of the reinforcing member. A locking clamp projected from the bottom is engaged with a hole of the reinforcing member. A notch portion communicated with the curved bottom surface and a bracket positioned at an upper side of the notch portion are provided on a sidewall of the protector. A receiving bracket of the reinforcing member is engaged with the notch portion, and the bracket is screwed and fixed to the receiving bracket. A bottom surface of a ground terminal is exposed in a bottom surface of the bracket, and the bottom surface of the ground terminal abuts on the conductive receiving bracket at the same time as the bracket is screwed and fixed.

3 Claims, 6 Drawing Sheets (51) Int. Cl.
  *B60R 16/02* (2006.01)
  *H02G 3/32* (2006.01)

(56) References Cited

U.S. PATENT DOCUMENTS

| | | | | |
|---|---|---|---|---|
| 5,669,590 | A | * | 9/1997 | Przewodek .................. 248/68.1 |
| 6,062,633 | A | | 5/2000 | Serizawa |
| 6,663,054 | B2 | * | 12/2003 | Robicheau et al. ............. 248/58 |
| 7,052,331 | B2 | * | 5/2006 | Maxwell et al. .............. 439/758 |
| 8,157,222 | B1 | * | 4/2012 | Shirey et al. ................. 248/74.1 |
| 8,366,059 | B2 | * | 2/2013 | Fannon et al. ............... 248/74.3 |
| 2004/0045734 | A1 | | 3/2004 | Tsunoda et al. |
| 2005/0217888 | A1 | | 10/2005 | Arai et al. |

FOREIGN PATENT DOCUMENTS

| | | | |
|---|---|---|---|
| JP | 2006-320096 | A | 11/2006 |
| JP | 2010-116097 | A | 5/2010 |

OTHER PUBLICATIONS

Communication dated Mar. 27, 2015, issued by the State Intellectual Property Office of P.R. China in counterpart Chinese application No. 201180042639.0.

* cited by examiner

WIRE HARNESS ATTACHMENT STRUCTURE

CROSS REFERENCE TO RELATED APPLICATIONS

This application is a National Stage of International Application No. PCT/JP2011/067248 filed Jul. 28, 2011, claiming priority based on Japanese Patent Application No. 2010-196508, filed Sep. 2, 2010, the contents of all of which are incorporated herein by reference in their entirety.

TECHNICAL FIELD

The present invention relates to a mounting structure of a wiring harness for, for example, mounting the wiring harness on a reinforcing member of an on-vehicle instrument panel via a protector.

BACKGROUND ART

Conventionally, various mounting structures of a wiring harness are proposed for mounting the wiring harness along a horizontal reinforcing member (reinforcing metallic pipe) of an on-vehicle instrument panel or the like.

For example, in PTL 1, it is described that when a synthetic-resin-made rectangular-tubular harness protector is mounted on a circular-sectional-shaped reinforcing member, and a locking clamp at a bottom of the harness protector is inserted into and engaged with a hole of the reinforcing member, the harness protector is fixed to the reinforcing member. A wiring harness (a plurality of electric wires) is previously inserted into the harness protector. The locking clamp includes a pair of claws at a tip end of a supporting column.

Further, in PTL 2, it is described that a flat harness protector into which a flat wiring harness is inserted is attached and fixed to a flat top surface of a cross-car beam (reinforcing member) with a locking clamp or a bolt.

CITATION LIST

Patent Literature

[PTL 1]
JP, A, 2006-320096 (FIGS. 4 and 5)
[PTL 2]
JP, A, 2010-116097 (FIG. 1)

SUMMARY OF INVENTION

Technical Problem

However, in the above conventional mounting structure of a wiring harness, when using a reinforcing member having a circular sectional shape, stability of the harness protector on the reinforcing member is not good, and there is a fear that mounting workability of the harness protector may be reduced, or a space around an upper portion of the reinforcing member may go to waste. Further, when using a reinforcing member having a flat top surface, there is a problem that cost of the reinforcing member may be increased, and a position for using the reinforcing member may be limited. Further, when it is necessary to grand to a vehicle body, there is a fear that man-hours may be increased for connecting a round terminal of the wiring harness to the reinforcing member with a bolt.

In view of the above problems, an object of the present invention is to provide a mounting structure of a wiring harness allowing a harness protector to be attached and fixed to a reinforcing member having a circular sectional shape stably in a space-saving manner, and allowing the harness protector to be mounted on the reinforcing member with good workability including a connection of a ground terminal.

Solution to Problem

For achieving the above object, according to a first aspect of the present invention, there is provided a mounting structure of a wiring harness including:
a protector into which the wiring harness is inserted, arranged on an upper portion of a circular-sectional-shaped horizontal on-vehicle reinforcing member along a longitudinal direction of the reinforcing member;
a curved concave portion formed on a bottom of the protector, engaged with a curved top surface of the reinforcing member; and
a locking clamp projected on the bottom, engaged with a hole of the reinforcing member.

According to the above, the protector into which the wiring harness is inserted is stably supported on the upper portion of the reinforcing member by an engagement between the curved concave portion and the curved top surface. The protector is positioned in a radial direction (horizontal direction) of the reinforcing member by the curved concave portion. The protector is locked and fixed to the reinforcing member with a single touch of the locking clamp. As the curved top surface of the reinforcing member is covered by the curved concave portion of the protector, a top space of the reinforcing member is effectively used. As the protector and the reinforcing member are overlapped with each other in a vertical direction at the curved concave, a projection length of the protector is reduced. Thereby, the mounting structure is in a space-saving manner.

According to a second aspect of the present invention, there is provided the mounting structure of a wiring harness as described in the first aspect,
wherein a notch portion communicated with the curved concave portion, and a bracket positioned at an upper side of the notch portion are provided on a sidewall of the protector, a receiving bracket of the reinforcing member is engaged with the notch portion, and the bracket is screwed and fixed to the receiving bracket.

According to the above, as the receiving bracket of the reinforcing member is engaged with the notch portion of the protector, it becomes unnecessary to increase a thickness of the receiving bracket or the bracket of the protector. Further, as the both side ends of the receiving bracket abut on both side ends of the notch portion, the protector is positioned in the longitudinal direction of the reinforcing member. In this condition, the bracket of the protector is firmly screwed and fixed to the receiving bracket with a nut and a bolt.

According to a third aspect of the present invention, there is provided the mounting structure of a wiring harness as described in the second aspect,
wherein a bottom surface of a ground terminal of the wiring harness is exposed in a bottom surface of the bracket, and the bottom surface of the ground terminal abuts on the conductive receiving bracket at the same time as the bracket is screwed and fixed.

According to the above, the ground terminal of the wiring harness is electrically connected to the receiving bracket at the same time as the bracket of the protector is screwed and fixed to the receiving bracket of the reinforcing member. The bracket works as a common bracket for fixing and for connecting the ground terminal at the same time. Regarding the screw fixture, preferably, a common bolt is coaxially inserted into the hole of the ground terminal and the hole of the bracket, and screwed with the nut of the receiving bracket. Preferably, a tip end of the ground terminal is inserted into the hole of the bracket, and the bottom surface of the tip end of the ground terminal is exposed in the bottom surface of the bracket.

According to a fourth aspect of the present invention, there is provided the mounting structure of a wiring harness as described in any one of the first to third aspect,
wherein a projecting portion of the protector is bent and projected parallel from the reinforcing member, and a curved bottom surface of a second bracket provided on the projecting portion opposite to a projecting direction is engaged with the curved top surface of the reinforcing member.

According to the above, the projecting portion of the protector is arranged with an effective use of a space outside (front side or rear side) in a radial direction of the reinforcing member. A height of the projecting portion can be set lower than the other portions of the protector, and the upper portion of the reinforcing member becomes in a space-saving manner. The projecting portion is stably supported by the circular-sectional-shaped reinforcing member in the curved bottom surface of the second bracket. The second bracket is fixed to the reinforcing member with a locking clamp or the like.

Advantageous Effects of Invention

According to the invention described in the first aspect, as the curved concave portion of the protector is engaged with the curved top surface of the reinforcing member, the protector can be stably and firmly fixed to the circular-sectional-shaped reinforcing member against a vibration of a vehicle or the like. Further, when the protector is positioned in the radial direction (horizontal direction) of the reinforcing member by the curved concave portion, the protector can be easily fixed with the locking clamp with good workability.

According to the inventions described in the second aspect, as the receiving bracket of the reinforcing member is inserted into and engaged with the notch portion of the protector, a bracket structure can save space. Further, as the protector is positioned in the longitudinal direction of the reinforcing member, the bracket can be screwed with good workability.

According to the invention described in the third aspect, the bracket is screwed and fixed to the receiving bracket at the same time as the ground terminal of the wiring harness is connected to the receiving bracket with a single screwing operation. Thereby, attaching workability of the wiring harness to the reinforcing member can be increased, and the mounting structure of the wiring harness can be simplified with low cost.

According to the invention described in the fourth aspect, the projecting portion of the protector is arranged with an effective use of a space outside (front side or rear side) in a radial direction of the reinforcing member, and stably supported and fixed to the circular sectional-shaped reinforcing member by the curved bottom surface of the second bracket.

DESCRIPTION OF EMBODIMENTS

FIGS. 1 to 8 show an embodiment of a mounting structure of a wiring harness according to the present invention.

Figure 1:
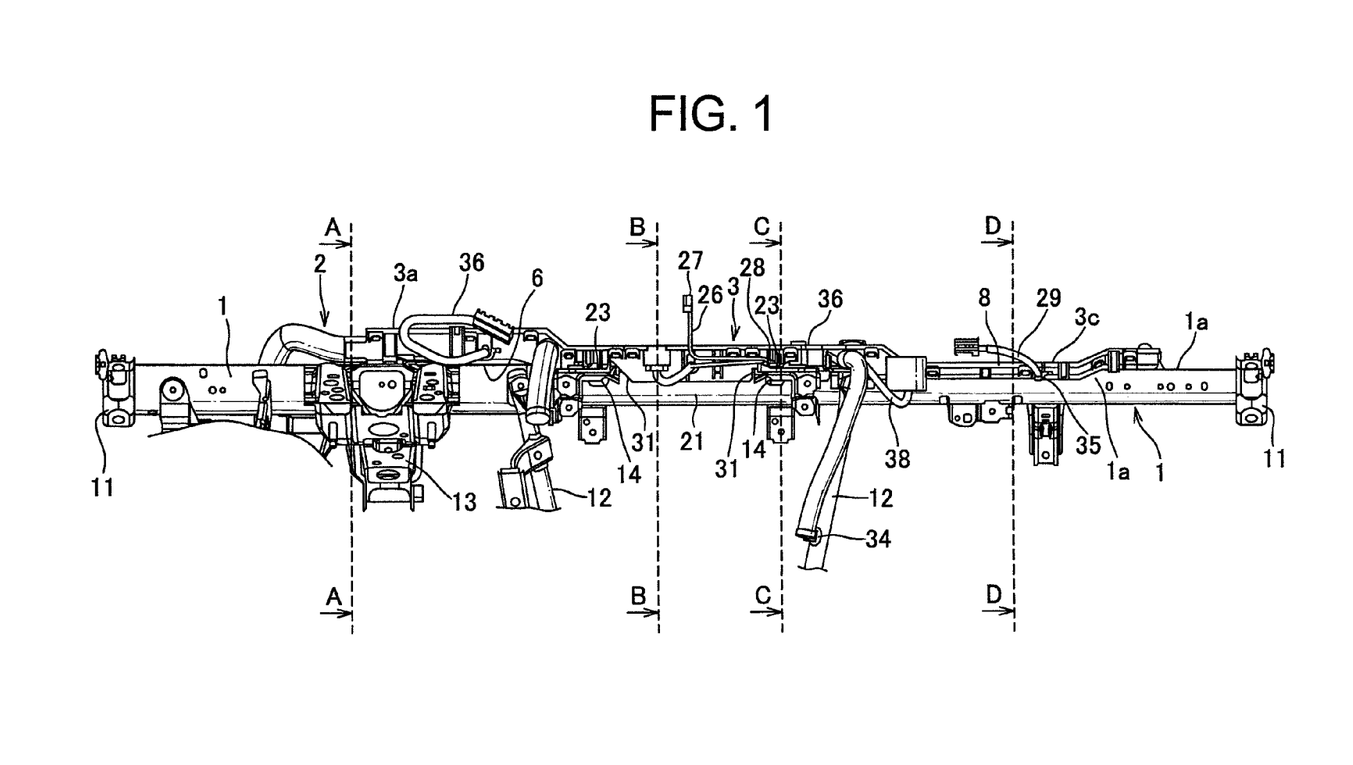
FIG. 1 is a front view showing an embodiment of a mounting structure of a wiring harness according to the present invention.
Figure 2:
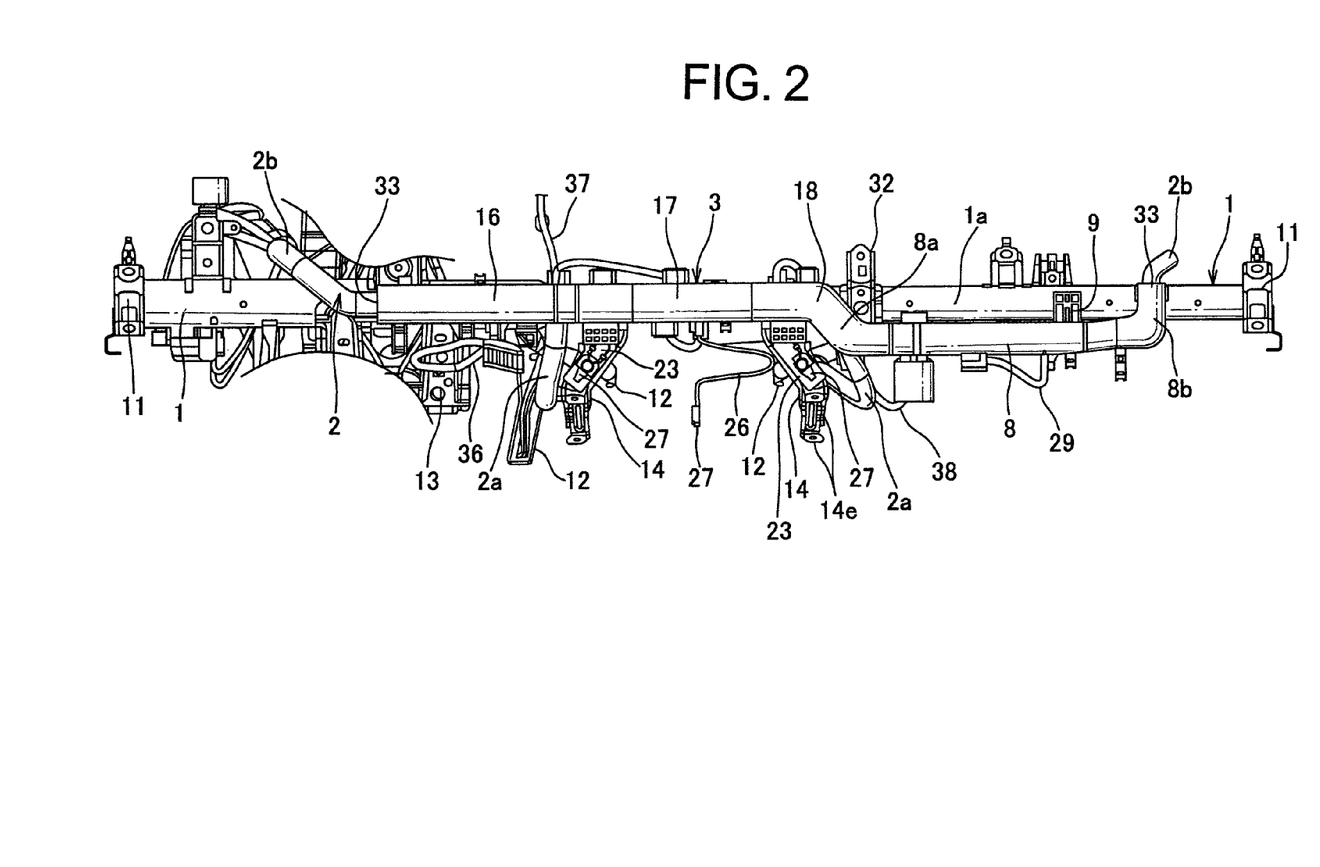
FIG. 2 is a plan view showing the mounting structure of a wiring harness.
Figure 3A:
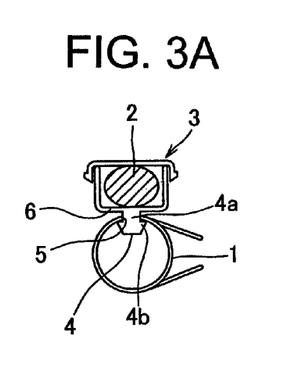
FIG. 3A is a sectional view taken on line A-A of FIG. 1.
Figure 3B:
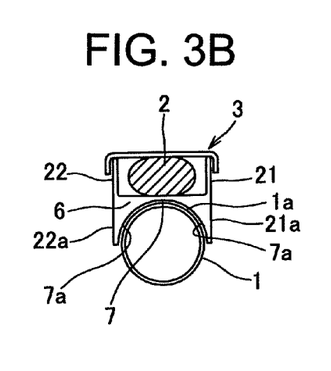
FIG. 3B is a sectional view taken on line B-B of FIG. 1.
Figure 3C:
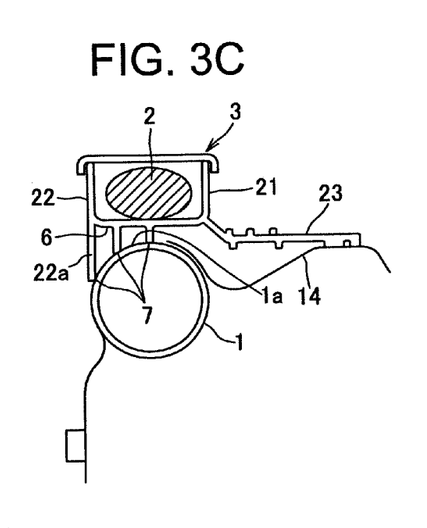
FIG. 3C is a sectional view taken on line C-C of FIG. 1.
Figure 3D:
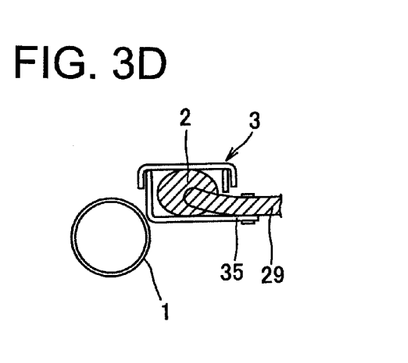
FIG. 3D is a sectional view taken on line D-D of FIG. 1.

As shown in FIG. 1 (front view) and FIG. 2 (plan view), a harness protector 3 (hereinafter referred to as protector) into which a wiring harness 2 is previously inserted is arranged on a center side except for left and right both ends in a longitudinal direction of a reinforcing member 1 as a circular-sectional-shaped metallic pipe arranged in an instrument panel of a vehicle. For example, as shown in FIG. 3A (sectional view taken on line A-A of FIG. 1) and FIG. 5 (bottom view), at least left and right both ends in a longitudinal direction of the protector 3 is locked and fixed to a hole 5 (FIG. 3A) of the reinforcing member 1 with a locking clamp 4 (FIG. 5). Further, as shown in FIGS. 3B and 3C (sectional views taken on lines B-B and C-C of FIG. 1), a curved concave portion 7 in a width direction is provided on a bottom wall 6 at the center side in the longitudinal direction of the protector 3, and the curved concave portion 7 is engaged with a curved upper portion 1a of the reinforcing member 1 to hold the reinforcing member 1. As shown in FIG. 2 and FIG. 3D (sectional view taken on line D-D of FIG. 1), a right end portion in FIG. 1 of the protector 3 is bent and projected forward in substantially a shallow U shape and removed forward from the reinforcing member 1. As shown in FIG. 2, this projecting portion 8 is supported by the reinforcing member 1 at a curved bottom surface 9a (FIG. 4) of a second bracket 9 projected backward from the protector 3.

As shown in FIGS. 1 and 2, the reinforcing member 1 is provided with side brackets 11 at both left and right sides, a left and right pair of center brackets 12 at the center side, and a steering bracket 13 at an observer's left side. Further, a left and right pair of receiving brackets 14 for fixing the protector 3 and for grounding the wiring harness 2 is substantially horizontally projected forward from an inside in between the left and right center brackets 12. FIG. 1 is a view seen from a rear side of a vehicle. An observer's left side of FIG. 1 is a left side of a vehicle, and the observer's right side is a right side of a vehicle.

Figure 4:
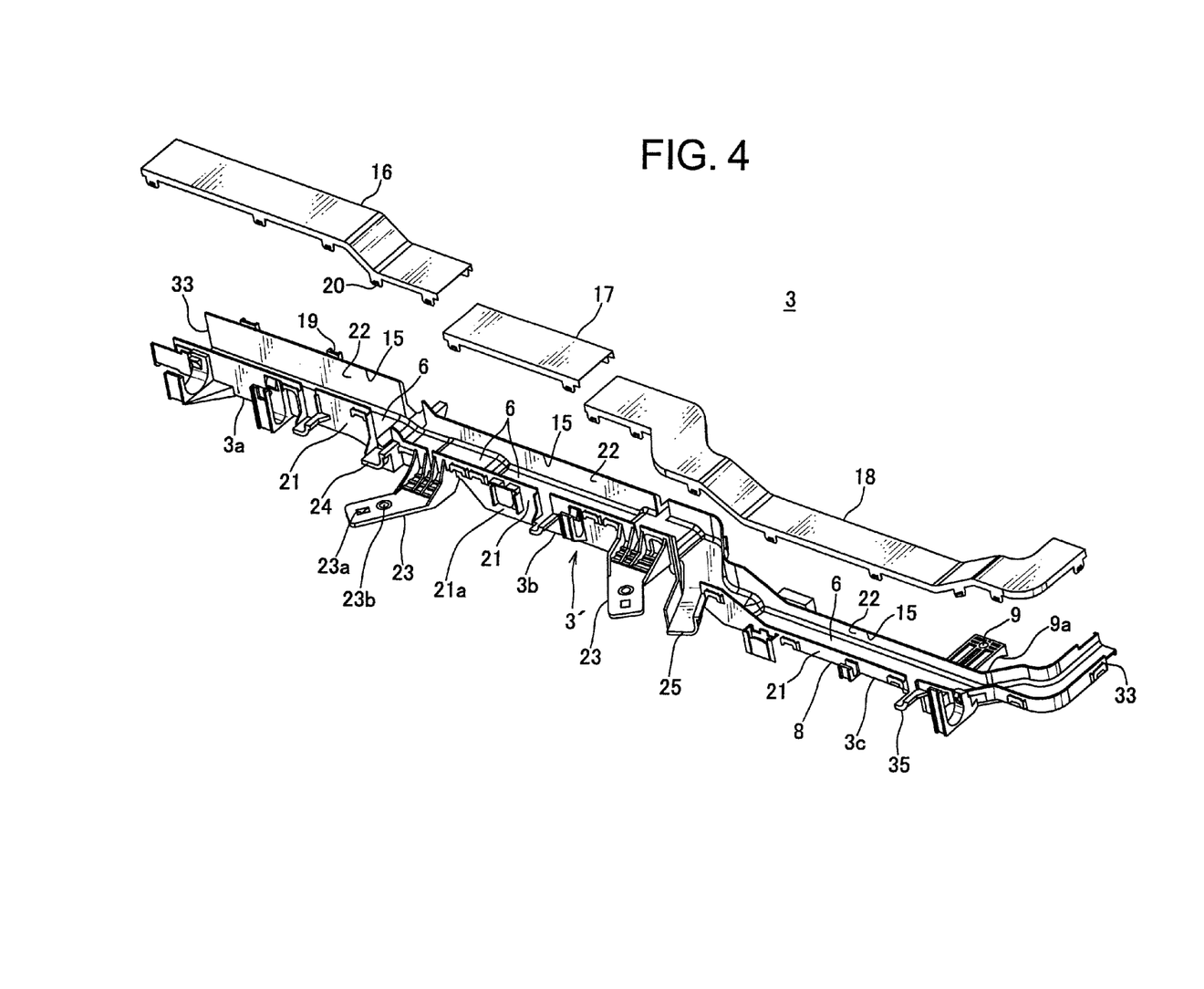
FIG. 4 is an exploded perspective view showing an embodiment of a protector used in the mounting structure of a wiring harness.
Figure 5:
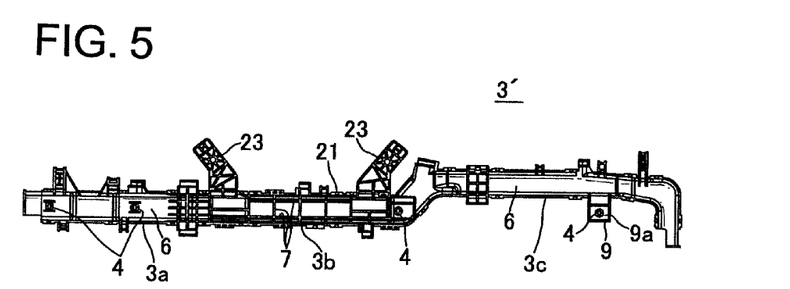
FIG. 5 is a bottom view showing the protector.

As shown in FIG. 4, the protector 3 is made of synthetic resin, and composed of a horizontally long protector main body 3' having a rectangular sectional shape and a gutter shape, and a plurality of (three in this embodiment) divided covers 16 to 18 covering an upper opening 15 of the protector main body 3'. The protector main body 3' and the covers 16 to 18 are locked together with locking members (locking frames 19 and locking claws 20 inserted into the locking frames 19).

As shown in FIG. 4 and FIG. 5 (bottom view), the protector main body 3' includes: a bottom wall 6; front and rear sidewalls 21, 22; and brackets 23, 9 projected in a front and rear direction from the sidewalls 21, 22. Horizontal harness branch portions 24, 25 are respectively provided on a boundary between a left side portion 3a and a center portion 3b, and a boundary between the center portion 3b and a right side portion 3c. The left side cover 16 covers the left side portion 3a and a part of the center portion 3b of the protector main body 3', the center small cover 17 covers the center portion 3b, and the right side cover 18 covers a part of the center portion 3b and the right side portion 3c.

As shown in FIG. 5 (bottom view), two left and right locking clamps 4 are projected parallel to each other from the bottom wall 6 of the left side portion 3a, a single locking clamp 4 is projected from the bottom wall 6 at a right end of the center portion 3b, and a single clamp 4 is projected from the curved bottom surface 9a of the second bracket 9 projected backward from the right side portion 3c. As shown in FIG. 3A, the locking clamp 4 is composed of a supporting column 4a projected from the bottom wall 6 of the protector main body 3', and a pair of claws 4b provided on a tip of the supporting column 4a.

Figures 8A, 8B:
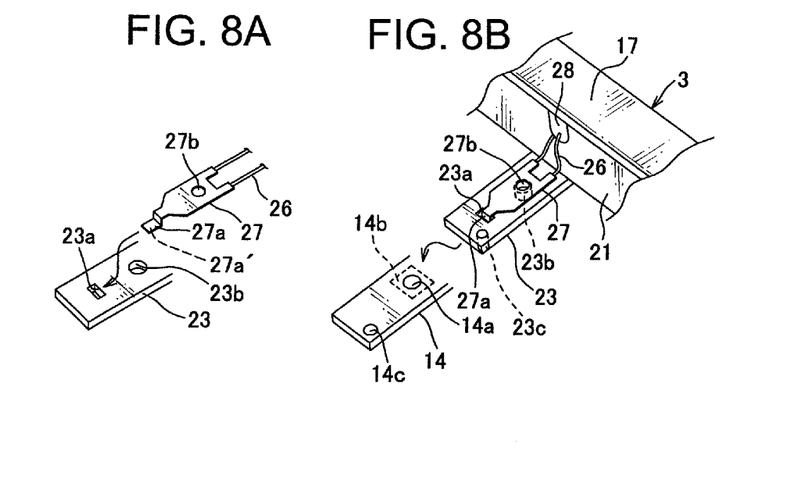
FIG. 8A is an exploded perspective view showing a condition that a ground terminal of the wiring harness is attached to the protector.
FIG. 8B is an exploded perspective view showing a condition that the protector having the ground terminal is attached to the reinforcing member.

As shown in FIGS. 4 and 5, a pair of brackets 23 bent in substantially a horizontal V-shape are projected from both left and right sides of the front sidewall 21 in the center portion 3b of the protector main body 3'. Each bracket 23 includes: a rectangular hole 23a at a tip side into which a front end portion 27a bent downward in substantially an L-shape of a ground terminal 27 continued to an electric wire 26 of the protector 3, and through which a bottom surface 27a' of the front end portion 27a is exposed in a bottom surface of the bracket 23 as shown in FIG. 8a; and a hole 23b at a rear side of the hole 23a with which a center hole 23b of the ground terminal 27 is communicated as shown in FIG. 8b. The bracket 23 includes: a downward positioning pin 23c corresponding to a hole 14c of the receiving bracket 14.

As shown in FIG. 8b, the ground terminal 27 and the bracket 23 are fixed together to the receiving bracket 14 with a bolt, while the bottom surface 27a' of the front end portion 27a of the ground terminal 27 electrically abuts on the conductive metallic receiving bracket 14 by inserting the bolt into both holes 27b, 23b, and by engaging with a hole 14a of the receiving bracket 14 of the reinforcing member 1 and with a nut 14b with which the hole 14a is communicated. In FIGS. 1 and 2, reference sign 27 denotes the ground terminal, and reference sign 26 denotes the electric wire connected to the ground terminal 27. The electric wire 26 is guided out through an opening 28 of the sidewall 21 of the protector main body 3'.

As shown in FIG. 4, front and rear sidewalls 21, 22 of the center portion 3b of the protector main body 3' are extended downward longer than the top surface of the bottom wall 6 (the extended wall portions are denoted by reference signs 21a, 22a). As shown in FIGS. 3B and 3C, the bottom wall 6 includes a curved bottom surface 7 as a circular-sectional-shaped curved concave. Front and rear ends of the curved bottom surface 7 are continued to bottom ends of the front and rear sidewalls 21, 22. An inner radius of the curved bottom surface 7 is equal to or a little larger than an outer radius of the reinforcing member 1.

The protector 3 is stably supported on the circular-sectional-shaped curved upper portion 1a of the reinforcing member 1 by the curved bottom surface 7. When the upper portion or upper half portion of the reinforcing member 1 is overlapped with the protector 3 in a height direction, the space around the upper portion of the reinforcing member 1 is effectively used, and saved. Further, when the front and rear portions 7a (FIG. 3B) of the curved bottom surface 7 abut on the front and rear outer surfaces of the reinforcing member 1, the protector 3 is positioned in the front and rear direction relative to the reinforcing member 1.

In FIG. 3C, reference sign 23 denotes a front bracket of the protector 3, reference sign 14 denotes a front receiving bracket of the reinforcing member 1 supporting the bracket 23, and reference sign 2 denotes a wiring harness (a plurality of electric wires) received in the protector 3. In FIG. 3D, reference sign 29 denotes a branch line of the wiring harness 2.

Figure 6:
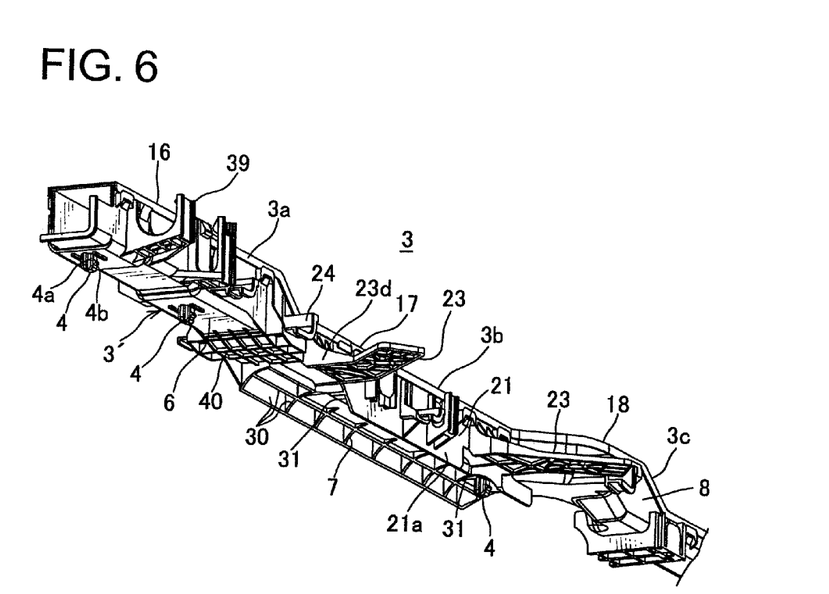
FIG. 6 is a bottom perspective view showing the protector.

As shown in FIG. 6, the curved bottom surface 7 of the protector main body 3' is composed of a plurality of curved tip surfaces of the rib 30 in front rear left and right direction. The locking clamps 4 are provided on the right end of the curved bottom surface 7 and on the bottom wall 6 in the left side portion 3a of the protector main body 3'. Root portions 23d of the left and right pair of forward horizontal bracket 23 in the center portion 3b of the protector main body 3' are positioned upper than the bottom end of the extended wall portion 21a of the front sidewall 21. Substantially trapezoid shaped or rectangular shaped notch portions 31 are provided on the sidewall 21 in between the root portion 23d and the bottom end of the sidewall.

Figure 7A:
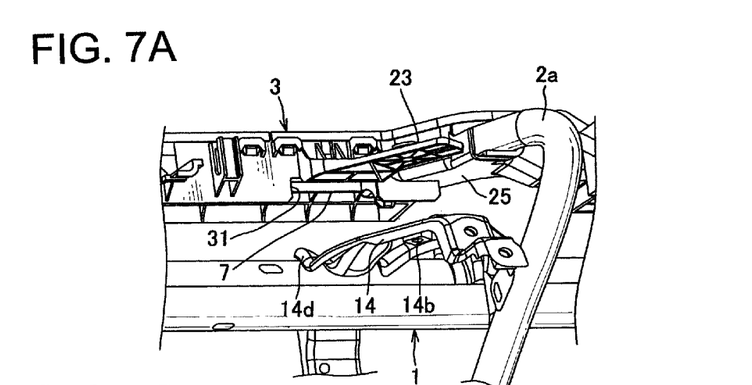
FIG. 7A is an exploded perspective view showing a condition that a wiring harness having the protector is attached to a reinforcing member.
Figure 7B:
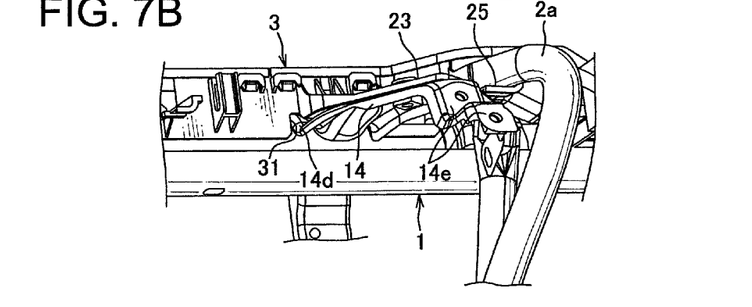
FIG. 7B is a perspective view showing a condition after the wiring harness is attached to the reinforcing member.

As shown in FIGS. 7A and 7B, when the root portions 14d of the horizontal receiving bracket 14 of the reinforcing member 1 is moved into and engaged with the notch portions 31 of the protector main body 3', and left and right side end surfaces of the root portion 14b of the receiving bracket 14 abut on left and right side end surfaces of the notch portion 31 in a left and right direction, the protector 3 is positioned in the left and right direction relative to the reinforcing member 1. When the bottom surface of the bracket 23 abuts on the top surface of the receiving bracket 14, the protector 3 together with the curved bottom surface 7 is stably supported without shaking in the front and rear direction by the reinforcing member 1. In FIG. 7A, reference sign 14b denotes a weld nut fixed to the bottom surface of the receiving bracket 14. A downward crank-shaped tip portion 14e of the receiving bracket 14 is fixed to the instrument panel with a bolt together with a rear bracket 32 (FIG. 2) and a side bracket 11 (FIG. 2).

As shown in FIGS. 1, 7A, and 7B, thick branch lines 2a of the wiring harness 2 are guided out forward from left and out outer branch portions 24, 25 of a pair of brackets 23 of the protector 3, and fixed to the center brackets 12 with the locking clamps 34 having bands. As shown in FIGS. 1 and 2, thick trunk lines 2b of the wiring harness 2 are guided out backward through openings 33 at left and right ends of the protector 3, and a thin branch line 29 having a connector is guided out forward from a right side portion of the protector 3. In FIG. 3D, reference sign 29 denotes a branch line, and reference sign 35 denotes a branch line guiding out portion. The wiring harness portion guided out forward from the protector 3 is arranged in an engine room of a vehicle or the like, and the wiring harness portion guided out backward is arranged in the instrument panel or the like.

As shown in FIG. 1, the right side portion 3c of the protector 3 is formed in a flat shape. As shown in FIG. 2, the right side portion 3c includes: a projecting portion 8 projected forward from the reinforcing member 1 and parallel to the reinforcing member 1; a short sloped portion 8a connecting the projecting portion 8a with the center portion 3b; and a bent portion 8b bent backward at the right end side. As shown in FIG. 1, the projecting portion 8 is positioned lower than the center portion 3b, and overlapped with the curved upper portion 1a of the reinforcing member 1 in the height direction. The left side portion 3a of the protector 3 is further higher than the center portion 3b, and the bottom wall 6 of the left side portion 3a is positioned substantially the same plane as the upper end of the reinforcing member 1.

As shown in FIG. 1, the protector 3 is formed in a step shape so that the left side portion 3a is higher than the horizontal reinforcing member 1, the center portion 3b is a little higher than the reinforcing member 1, and the right side portion 3c is lower than the reinforcing member 1. As shown in FIG. 2, relative to the straight reinforcing member 1 in the left and right direction, the left side portion 3a and the center portion 3b of the protector 3 are positioned on the same line on the reinforcing member 1, and the right side portion 3c is projected forward a little.

In FIGS. 1 and 2, reference signs 36 to 38 denote the branch lines guided out forward and backward from the protector 3. In FIG. 6, reference sign 39 denotes a holding frame for holding a wire member (not shown) of the other wiring harness or the like arranged along the protector 3, and reference sign 40 denotes a supporting bottom wall for abutting on the top surface of the reinforcing member 1.

Incidentally, the configuration explained in the above embodiment can be used in a mounting method of a wiring harness, a harness protector structure, or the like other than the mounting structure of a wiring harness.

INDUSTRIAL APPLICABILITY

The mounting structure of a wiring harness according to the present invention can be used for, for example, mounting the wiring harness on a reinforcing member of an instrument panel of a vehicle with good workability and in a space-saving manner.

REFERENCE SIGNS LIST 1 reinforcing member
2 wiring harness
3 protector
4 locking clamp
5 hole
7 curved concave portion (curved bottom surface)
8 projecting portion
9 second bracket
9a curved bottom surface
14 receiving bracket
21 sidewall
23 bracket
27 ground terminal
27a' bottom surface
31 notch portion

The invention claimed is:

1. A mounting structure of a wiring harness comprising:
   a protector into which the wiring harness is inserted, arranged on an upper portion of a circular-sectional-shaped horizontal on-vehicle reinforcing member along a longitudinal direction of the reinforcing member;
   a curved concave portion formed on a bottom of the protector, engaged with a curved top surface of the reinforcing member; and
   a locking clamp projected on the bottom, engaged with a hole of the reinforcing member,
   wherein a notch portion communicated with the curved concave portion, and a bracket positioned at an upper side of the notch portion are provided on a sidewall of the protector, a receiving bracket of the reinforcing member is engaged with the notch portion, and the bracket is screwed and fixed to the receiving bracket.

2. The mounting structure of a wiring harness as claimed in claim 1,
   wherein a bottom surface of a ground terminal of the wiring harness is exposed in a bottom surface of the bracket, and the bottom surface of the ground terminal abuts on the conductive receiving bracket at the same time as the bracket is screwed and fixed.

3. The mounting structure of a wiring harness as claimed in claim 1, wherein a projecting portion of the protector is bent and projected parallel from the reinforcing member, and a curved bottom surface of a second bracket provided on the projecting portion opposite to a projecting direction is engaged with the curved top surface of the reinforcing member.

* * * * *